(12) United States Patent
Fujimura et al.

(10) Patent No.: US 6,576,888 B2
(45) Date of Patent: Jun. 10, 2003

(54) LIGHT RECEIVING MODULE INCLUDES A SIGNAL PROCESSING SEMICONDUCTOR ELEMENT

(75) Inventors: Yasushi Fujimura, Yokohama (JP); Yuuji Kida, Yokkaichi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 117 days.

(21) Appl. No.: 09/931,164

(22) Filed: Aug. 17, 2001

(65) Prior Publication Data

US 2002/0025123 A1 Feb. 28, 2002

(30) Foreign Application Priority Data

Aug. 18, 2000 (JP) ........................................ 2000-248611

(51) Int. Cl.[7] .................................................. G01J 1/04
(52) U.S. Cl. ................ 250/227.11; 250/239; 250/214.1
(58) Field of Search ....................... 250/227.11, 227.24, 250/214.1, 216, 239, 551; 257/79–84, 431–434; 385/9–14

(56) References Cited

U.S. PATENT DOCUMENTS 6,386,768 B1 * 5/2002 Yoon et al. .................... 385/88

FOREIGN PATENT DOCUMENTS

| JP | 63-35114 | 7/1988 |
| JP | 3019078 | 1/2000 |

OTHER PUBLICATIONS

Y. Oikawa et al. "Packaging Technology for a 10–Gb/s Photoreceiver Module" *Journal of Lightwave Technology* vol. 12, No. 2, Feb. 1994 pp 343–352.
Y. Kito et al. "High–Speed Flip–Chip InP/InGaAs Avalanche Photodiodes with Ultralow Capacitance and Large Gain–Bandwidth Products" *IEEE Transactions Photonics Technology Letters* vol. 3, No. 12, Dec. 1991, pp1115–1116.
"APD Receiver Module for 10 Gbps High–speed Data Communication" *FUJITSU.51*, 3, pp. 152–155 (May, 2000).

* cited by examiner

*Primary Examiner*—Que T. Le
(74) *Attorney, Agent, or Firm*—Smith, Gambrell & Russell, LLP

(57) ABSTRACT

An light receiving module 2 consists of a mount substrate 20, an optical fiber 18, a semiconductor photodetector 22, a mount member 26, and a signal processing semiconductor element 28. The mount member 26 has a pair of arm portions and a joint portion. Each arm portion extends along a first direction. The joint portion extends along a direction perpendicular to the first direction and connects the pair of arm portions. The optical fiber 18 has a first end and a second end. The semiconductor photodetector 22 has a light incidence surface optically coupled to the first end of the optical fiber 18, and a light receiving element part. The mount substrate 20 is placed between the pair of arm portions of the mount member 26 and carries the optical fiber 18 and the semiconductor photodetector 20. The signal processing semiconductor element 28 is placed on the mount member 26 and processes a signal from the semiconductor photodetector 22.

20 Claims, 13 Drawing Sheets

LIGHT RECEIVING MODULE INCLUDES A SIGNAL PROCESSING SEMICONDUCTOR ELEMENT

BACKGROUND OF THE INVENTION

1. Field of the Invention

The present invention relates to a light receiving module.

2. Related Background Art

The conventional light receiving modules are generally classified into the following two types. The first type embraces light receiving modules containing a waveguide type semiconductor photodetector, and the second type embraces light receiving modules containing a surface receiving type semiconductor photodetector.

SUMMARY OF THE INVENTION

In the technical field of optical communications, there are demands for light receiving modules capable of operating at high speeds. For example, these light receiving modules are recently required to perform transmission at about 10 Gbps. However, according to the inventor's technical knowledge, it is not easy to develop a structure of an optical communication module capable of providing electric signals from the light receiving element at the foregoing fast transmission rate while maintaining sufficient coupling efficiency between an optical fiber and the light receiving element even with variation in alignment between the optical fiber and the light receiving element in manufacturing process. Namely, there are needs for an optical communication module capable of processing electric signals including transmission information at about 10 Gbps while maintaining the optical coupling efficiency.

In the optical communication modules of the former type, an optical fiber and a waveguide semiconductor photodetector are arranged on a straight line. In this configuration, the propagation direction of optical signals coincides with the transmission direction of electric signals. An end face of the optical fiber is optically coupled with one end face of the waveguide semiconductor photodetector. In the former type, since the optical characteristics of the optical communication modules are sensitive to the alignment between the optical fiber and the waveguide light receiving element, it is necessary to carry out the positioning of the two members with high accuracy.

In the latter type, the end face of the optical fiber is optically coupled with a light-receiving surface of the surface receiving type semiconductor photodetector. In this type, however, one end of the optical fiber faces the light receiving surface of the surface receiving type semiconductor photodetector. On the other hand, generally, the light receiving element and an electron device are placed on a common plane so as to be connected with each other, such that the light receiving element is connected through bonding wires to the electron device. In this configuration, the traveling direction of optical signals does not coincide with the traveling direction of electric signals. According to the inventor's technical experiences, it can be hardly said that this structure is applicable to the light receiving modules.

Without using the above configuration, there is another candidate for the structure as shown below. This light receiving module has a configuration in which the surface receiving type semiconductor photodetector is mounted on one side face of a submount of rectangular parallelepiped and an electron device is mounted on an upper surface of the submount. The two devices are connected to each other through an conductive layer extending from the upper surface to the side face of the submount. In this structure, the optical fiber, surface receiving semiconductor photodetector, and electron device are arranged in a line, but the structure is complicated.

Another known module is an light receiving module in which the surface receiving type semiconductor photodetector and the electron device are mounted on an upper surface of a submount and in which light from one end of the optical fiber is guided via a concave mirror to the light-receiving surface of the surface receiving type photodetector. In this structure, the optical fiber, surface receiving type semiconductor photodetector, and electron device are also arranged in a line. However, an additional optical component such as the concave mirror is required for the optical coupling between the optical fiber and the surface receiving type semiconductor photodetector.

In both configurations above, the structures of the light receiving modules are complex and require their tolerance to be close for the alignment between the optical fiber and the photodetector. This means that a plateau region in the coupling efficiency between the optical fiber and the photodetector, i.e. the range in which the optical coupling efficiency is substantially invariable with variation in their alignment, is small.

It is an object of the present invention to provide an light receiving module capable of achieving satisfactory coupling efficiency between the optical fiber and the semiconductor photodetector and capable of increasing data transmission rates.

One aspect of the present invention is a light receiving module. The light receiving module comprises a mounting member, an optical fiber, a semiconductor photodetector, a mount substrate, and a signal processing semiconductor element.

The mounting member has a pair of arm portions and a connecting portion. Each of the arm portions extends in a first direction. The connecting portion extends in a direction intersecting with the first direction to connect the pair of arm portions. The optical fiber has a first end and a second end. The semiconductor photodetector has a light incidence surface optically coupled to the first end of the optical fiber, and a light receiving element portion. The mounting substrate is arranged between the pair of arm portions of the mounting member and is mounted with the optical fiber and the semiconductor photodetector. The signal processing semiconductor element is placed on the mounting member and processes a signal from the semiconductor photodetector.

By the mounting substrate, the optical fiber is enabled to be optically coupled to the semiconductor photodetector. The mounting substrate is placed between the pair of arm portions of the mounting member. This arrangement permits the placement of the signal processing semiconductor element in the proximity of the semiconductor photodetector. This placement ensures the satisfactory optical coupling between the optical fiber and the semiconductor photodetector and permits reduction in the length of electrical connection between the semiconductor photodetector and the signal processing semiconductor element in the light receiving module.

The light receiving module may also be configured to further comprise a housing capable of accommodating the mounting substrate and the mounting member. The housing has a plurality of wall portions and terminals. The mounting member is placed so as to be located between the mounting substrate and the wall portions. The semiconductor photodetector is electrically connected to the terminals via a wiring member placed on the mount member. The wiring member on the mounting member enables the reduction of a connection path between the semiconductor photodetector and the terminals of the housing.

In the light receiving module, the semiconductor photodetector has an electrode surface on which electrode pads are provided, and the semiconductor signal processor has a pad surface on which electrode pads are provided. The pad surface and the electrode surface are arranged to be positioned relative to a reference surface within manufacturing positional variations. This arrangement of the pad surface and the electrode surface makes a reduction feasible in the wire length between the semiconductor photodetector and the signal processing semiconductor element.

The light receiving module may also be configured to further comprise a housing that accommodates the mounting member and the mounting substrate and contains therein a wiring surface having a wiring layer. In this light receiving module, the signal processing semiconductor element has a pad surface on which electrode pads are provided. The wiring surface and the pad surface are arranged so as to be positioned relative to a reference surface within a range of manufacturing positional deviation. This arrangement of the wiring surface and the pad surface allows the reduction of a connection path between the wiring layer on the wiring surface and the signal processing semiconductor element.

In the light receiving module, the pad surface, the wiring surface, and the mounting surface of the mounting member are arranged so as to be positioned relative to a reference surface within a range of manufacturing positional deviation. This arrangement of the mounting surface, the pad surface, and the wiring surface makes a reduction feasible in connection paths among the semiconductor photodetector, the wiring layer on the wiring surface, and the signal processing semiconductor element.

In the above-stated configurations of the light receiving module, the connection paths can be formed of bonding wires, for example.

The features of the present invention described below can be combined with the invention as described above. The features of the present invention described below can be combined in arbitrary combination with each other, which permits the module to obtain respective functions and advantages and those achieved by the combination.

In the light receiving module, the optical fiber, the semiconductor photodetector and the signal processing semiconductor element are arranged in turn in a predetermined direction. The semiconductor photodetector is placed to face on one side of the signal processing semiconductor element. This placement enables the reduction of the wire length between the semiconductor photodetector and the signal processing semiconductor element because an optical signal from the optical fiber is incident to the semiconductor photodetector and an electric signal from the semiconductor photodetector propagates to the signal processing semiconductor element.

The light receiving module may also be configured so that the mounting member has a depressed portion provided in a principal surface thereof and the signal processing semiconductor element is placed in the depressed portion. According to the depth of the depressed portion, the pad surface of the signal processing semiconductor element can be adjusted in height with the reference surface.

The light receiving module may also be configured so that the mounting member has a thermal conductivity larger than that of the mounting substrate. In this configuration, the signal processing semiconductor element and the semiconductor photodetector are separately mounted on the mounting member and substrate, respectively. It also makes it feasible to place the signal processing semiconductor element on the mounting member, which generates heat greater than the semiconductor photodetector does. This allows the heat, generated in the signal processing semiconductor element, to efficiently conduct to the outside of the light receiving module. This heat is not transferred directly to the photodetector and the optical fiber because the mounting member is separate from the mounting substrate.

The light receiving module may also be configured so that the mounting substrate comprises first, second and third regions arranged on a principal surface thereof in the first direction. The first region is provided with an optical fiber supporting portion extending in the first direction. The second region is provided with a positioning portion having an abutment face extending in a direction intersecting with the first direction. The third region is provided with a photodetector mounting portion on which the semiconductor photodetector is mounted, and the photodetector mounting portion has a reflective surface extending in a direction intersecting with the first direction and a light introducing path for introducing the light from the optical fiber to the reflective surface.

This mounting substrate enables the alignment of the optical fiber and the semiconductor photodetector with predetermined accuracy. Light from the optical fiber is reflected by the reflective surface provided on the mounting substrate and thereafter travels via the light incidence surface of the semiconductor photodetector to the light receiving element portion thereof.

In the light receiving module, the optical fiber supporting portion has first and second supporting surfaces for supporting the optical fiber, and the optical fiber is supported by the first and second support surfaces while the first end of the optical fiber abuts against the abutment face.

In the light receiving module, the light incidence surface of the semiconductor photodetector has a monolithic lens thereon, and the semiconductor photodetector can be placed such that the light incidence surface thereof faces the photodetector mounting portion of the mounting substrate.

Since the semiconductor photodetector is provided with the monolithic lens, the relative positional accuracy becomes satisfactory between the photodetector portion and the monolithic lens. Although the monolithic lens is provided between the optical fiber and the light receiving portion, there is no need for additional alignment for the monolithic lens. In the light receiving module, the monolithic lens can enhance the optical coupling between the optical fiber and the semiconductor photodetector.

The position of the light receiving portion is also associated with the position of the first end of the optical fiber by the mounting substrate. The light from the optical fiber is converged in the light receiving portion by the monolithic lens. This can decreases the area of the light detection required for ensuring a predetermined amount of light. The reduction of the area results in the decrease of the capacitance of the light receiving portion.

In the light receiving module, the light introducing path has its size sufficient to accommodate the monolithic lens. In this structure, when the semiconductor photodetector is placed on the photodetector mounting portion, the light introducing path can accommodate the monolithic lens that is projected on the light incidence surface.

The light receiving module may also be configured that the housing has an inlet through which the optical fiber extends in s direction of a predetermined axis. The mounting substrate has an optical fiber introducing portion through which the optical fiber from the inlet passes, and this optical fiber introducing portion is provided so as to extend in the predetermined direction from one edge thereof, facing the inlet portion of the housing, up to the optical fiber supporting portion. The optical fiber is introduced through the inlet into the housing, then passes the optical fiber introducing portion, and thereafter reaches the optical fiber supporting portion on the mounting substrate. If there is a positional mismatch between the optical fiber in the inlet and the optical fiber supporting portion of the mounting substrate, the optical fiber can be bent between the housing and the mounting substrate. The optical fiber introducing portion is provided between the inlet of the housing and the optical fiber supporting portion of the mounting substrate, and can be utilized so as to compensate for the positional mismatch of the optical fiber between the inlet and the optical fiber supporting portion.

The light receiving module may also be configured to further comprise a cover member having a cover surface for positioning the optical fiber. The optical fiber is positioned in the first region by the first and second support faces and the cover surface of the cover member.

The light receiving module may also be configured to further comprise a ferrule having a pair of end faces and holding the optical fiber. The second end of the optical fiber appears at one of the pair of end faces of the ferrule.

The light receiving module may also be configured to further comprise a housing which accommodates the mounting member and the mounting substrate. The housing has first to third wall portions and a wiring surface provided along the first to third wall portions. The first and second wall portions extend in the first direction and the third wall portion extends in a direction intersecting with the first direction. The wiring surface has a wiring layer thereon. One of the arm portions of the mounting member is placed between the first wall portion and the mounting substrate. The other of the arm portions is placed between the second wall portion and the mounting substrate. The connecting portion is located between the third wall portion and the mounting substrate.

In the light receiving module, the optical fiber introducing portion comprises first and second faces defining a recess extending in a direction of a predetermined axis and letting the optical fiber pass. The optical fiber introducing portion has a taper region in an end thereof connecting to the optical fiber supporting portion. The taper region comprises first and second taper faces placed between the first and second support faces of the optical fiber supporting portion and the first and second faces of the optical fiber introducing portion, respectively. The first and second taper faces make obtuse angles with respect to the first and second support faces.

The light receiving module may also be configured to further comprise an island mounted with the mount member and the mounting substrate, a plurality of lead terminals, and a ferrule having a pair of end faces and holding the optical fiber. The second end of the optical fiber appears at one of the pair of end faces of the ferrule.

The light receiving module may also be configured to further comprise a resin body for molding the mount member, the mounting substrate, the semiconductor photodetector, and the signal processing semiconductor element therein. The ferrule projects out of the molding resin body.

In the light receiving module, the plurality of lead terminals are arranged to face on each of the pair of arm portions and the connecting portion of the mounting member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features, and advantages of the present invention will be understood more easily from the detailed description of preferred embodiments of the present invention which will be presented with reference to the accompanying drawings, in which.

DETAILED DESCRIPTION OF THE PREFERRED EMBODIMENTS

The teaching of the present invention can be readily understood in view of the detailed description which will be given below with reference to the accompanying drawings illustrative of the invention. The embodiments of the present invention will be described hereinafter with reference to the accompanying drawings. The same portions will be denoted by the same reference symbols, if possible.

First Embodiment

Figure 1:
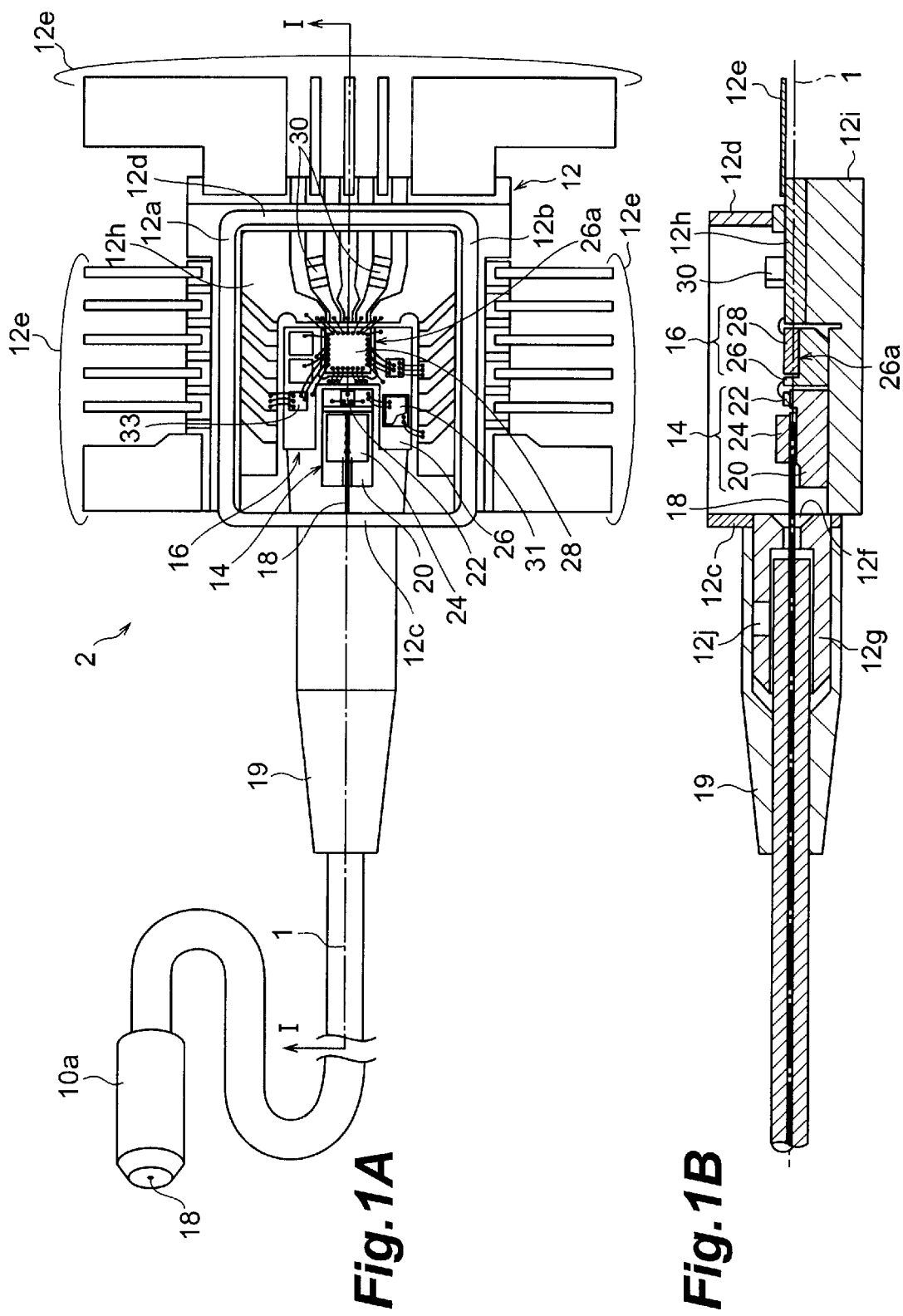
FIG. 1A is a plan view of a pigtail type light receiving module according to a first embodiment, and FIG. 1B a cross-sectional view taken along line I—I of the pigtail type light receiving module according to the first embodiment.
Figure 2:
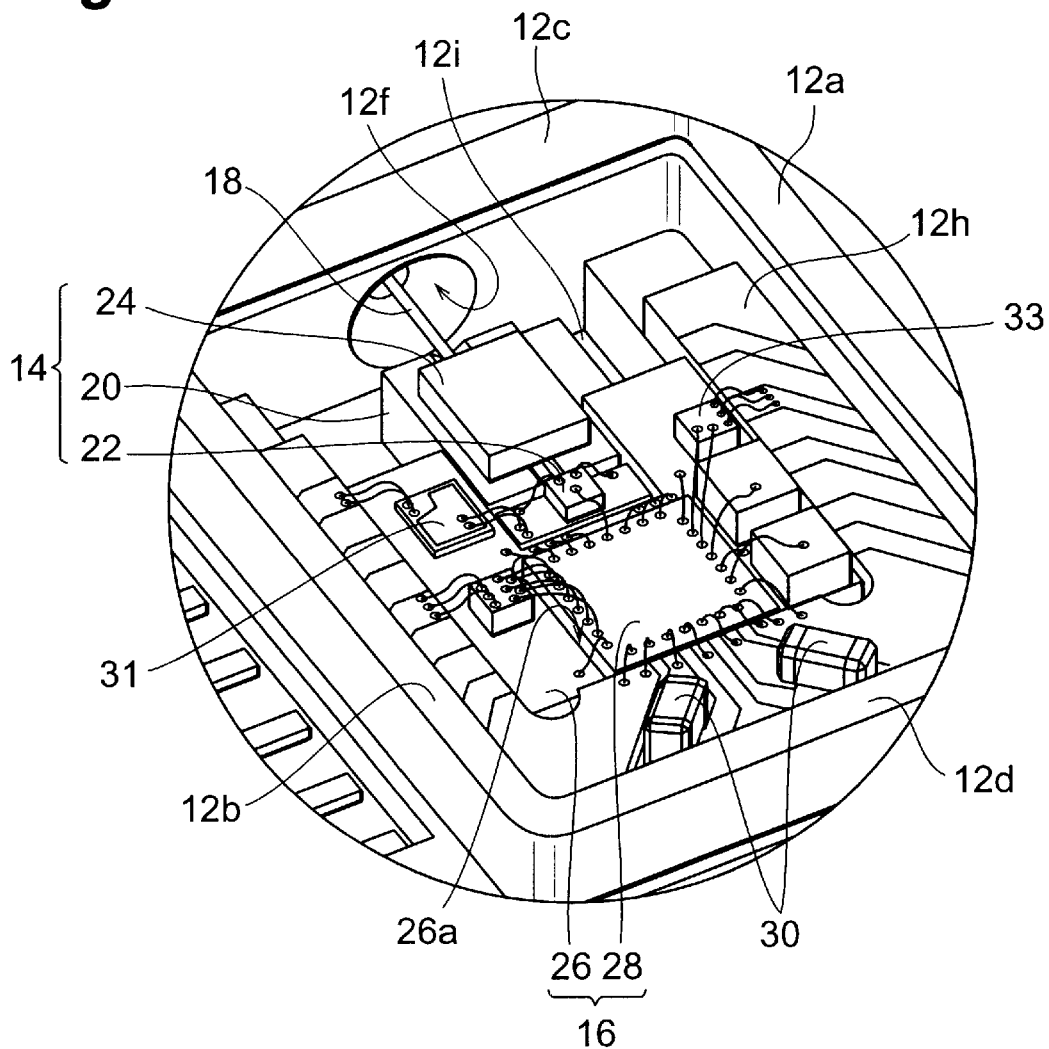
FIG. 2 is a perspective view showing the major part of the pigtail type light receiving module according to the first embodiment.

The pigtail type light receiving module according to the first embodiment will be described referring to FIGS. 1A, 1B and 2. This light receiving module 2 comprises an optical coupling device 10a, a housing such as a package 12, a light receiving assembly 14, a signal processing assembly 16, and an optical fiber 18.

The optical coupling device 10a is coupled to the second end of the optical fiber 18. The optical coupling device 10a can be an optical connector or a ferrule, for example.

The package 12 has first and second side walls 12a, 12b extending in a predetermined direction, an introducing wall 12c for accepting the optical fiber, and a third side wall 12d opposed to the introducing wall. The package 12 is, for example, a butterfly type package. Each of the first to third side walls 12a, 12b, 12d is equipped with a plurality of terminals 12e. The introducing wall 12c is provided with an optical fiber inlet 12f for introducing the optical fiber therethrough. Outside the optical fiber introducing wall 12c, a guide portion 12g projects in the predetermined direction at the inlet 12f. The guide portion 12g is provided with one end, the other end and an optical fiber insertion hole (the direction of which is defined as an introduction direction of the optical fiber) provided so as to insert the optical fiber therein from one end to the other end thereof. The optical fiber 18 is inserted into the optical fiber insertion hole and passes through the inlet 12f into the interior of the package. The guide portion 12g is also provided with a through hole 12j reaching the optical fiber insertion hole. After the optical fiber 18 is inserted in the guide portion 12g, resin is poured into this through hole 12j to secure the optical fiber 18 to the guide portion 12g. The periphery of the guide portion 12g is covered by a protective member such as a rubber boot 19, which can reduce external force exerted on the optical fiber 18 at the end of the guide portion 12g.

The light receiving assembly 14 and the signal processor assembly 16 are arranged to be directed in the direction of predetermined axis 1 on a bottom portion 12i of the package 12. The bottom portion 12i can be made of CuW, for example.

The light receiving assembly 14 comprises the mounting substrate 20 and the semiconductor photodetector 22. The semiconductor photodetector 22 is placed on a principal face of the mounting substrate 20. When the light receiving assembly 14 is placed in the package 12, the height of the principal surface of the mounting substrate 20 is substantially aligned with that of the optical fiber inserted to the package 12. The term "substantially aligned" herein means that positional deviation in height between the optical fiber and the principal surface is within the range of manufacturing variation. By this alignment, the height of the optical fiber 18 becomes substantially coincident with the height of the principal surface of the mounting substrate 20. Therefore, the optical fiber 18 is introduced into the package 12 and can reach the light receiving assembly 14 without undesired bending thereof. The optical fiber 18 is positioned on the mounting substrate 20 and then is secured by a cover member 24.

The signal processing assembly 16 includes a mounting member 26 and a signal processing semiconductor element 28. The signal processing semiconductor element 28 is mounted on the mounting member 26. The signal processing assembly 16 comprises the mounting member 26, the signal processing semiconductor element 28, and passive elements 31 such as resistors and capacitors. The height of a device surface (pad surface) of the signal processing semiconductor element 28 is associated with the height of an upper surface (electrode surface) of the semiconductor photodetector 22 placed on the principal surface of the mounting substrate 20. In order to implement this configuration, the signal processing semiconductor element 28 can be arranged in a depressed portion (26a in FIG. 1B) of the mounting member 26 if necessary. The height of the signal processing semiconductor element 28 is adjusted in accordance with the depth of this depressed portion. This adjustment permits adjustment in height between the pad surface and the electrode surface, which can reduce the length of a bonding wire connecting the signal processing semiconductor element 28 with the light receiving element 22.

Further, the package 12 has a wiring substrate 12h. A wiring member 33 is placed on the mounting member 26 in order to establish electrical connection of the terminals 12e to the light receiving element 22 and the signal processing semiconductor element 28 via a wiring surface of the wiring substrate 12h. In order to implement this configuration, the wiring substrate 12h is configured along the side walls 12a, 12b and 12d on which the terminals 12e are arranged. Specifically, the wiring substrate 12h has first, second and third regions. The first and second regions extend in the predetermined direction between the mounting substrate 20 and each of the side walls 12a and 12b, respectively. The third region extends in a direction perpendicular to the predetermined direction between the mount substrate 20 and the side wall 12d and is arranged between the first and second regions to connect them with each other. This configuration allows the wiring substrate 12h to face on a plurality of side faces (on three sides in the example of FIG. 1A) of the signal processing assembly 16 and allows the light receiving assembly 14 to face on a plurality of side faces (on three sides in the example of FIG. 1A) of the signal processor assembly 16.

The height of the wiring surface of the wiring substrate 12h is associated with that of the principal surface of the mounting member 26. This arrangement can decrease the lengths of bonding wires that extend from the wiring substrate 12h to the signal processing semiconductor element 28 and to the mounting member 26. The height of the pad surface of the signal processing semiconductor element, mounted on the mounting member 26, is associated with that of the electrode surface of the semiconductor photodetector 22 on the mounting substrate 20. This arrangement can also decrease the lengths of bonding wires that connect the mounting substrate 20 to the mounting member 26 even when the electrodes of the photodetector 22 are connected to the wiring substrate 12h through the mounting member 26. In a preferred embodiment, respective heights of the wiring surface of the wiring substrate 12h, the pad surface of the signal processor 28, and the electrode surface of the photodetector 24 fall within a range of 2 mm with respect to a certain reference surface. More preferably, this range is not more than ±0.50 mm and this value can be realized in manufacturing steps for the present light receiving module. In addition, the bonding wire lengths can be reduced to below 1 mm by connecting the wiring substrate 12h, signal processing semiconductor element 28, and photodetector 22 with each other through a conductive layer on the mounting member 26.

The mounting member 26 will be described below. The mounting member 26 is placed so as to face the side walls 12a, 12b, 12d on which the terminals 12e are disposed. The mounting member 26 has a pair of arm portions and a connecting portion. The pair of arm portions is arranged in the predetermined direction between the mounting substrate 20 and each of the side walls 12a and 12b, respectively. The connecting portion is arranged to connect the pair of arm portions and arranged so as to be directed in a direction perpendicular to the predetermined direction between the mount substrate 20 and the side wall 12d. The connecting portion has a device mount area for mounting the signal processing semiconductor element 28. Since the mounting member 26 faces on a plurality of edges of the mounting substrate 20 in this structure, it becomes feasible to establish electrical connection between the two members on these edges.

In a preferred embodiment, the mounting member 26 is made of metal, such as CuW, with excellent thermal conductivity. In addition, if the bottom portion 12i of the package 12 is also made of metal having excellent thermal conductivity, the bottom portion 12i facilitates the dissipation of heat generated in the signal processing semiconductor element 28 to the outside of the package. The signal processing semiconductor element 28 is placed on the connecting portion of the mounting member 26, while the passive elements 31 or the wiring member 33 is mounted on each arm portion. The mounting member 26 of this structure enables the signal processing semiconductor element 28 to be adjacent to the photodetector 22, thereby decreasing lengths of bonding wires connecting these elements with each other.

At transmission rates of about 10 Gbps or higher, the inductance due to wires becomes unnegligible. In a wire diameter of 25 μm, a 1 mm-long wire produces an inductance of about 0.8 nH. These values produces an impedance of approximately 37.7 Ω at the frequency of 7.5 GHz. There exists a capacitance of approximately sub-pF at the input of a photodiode or integrated circuit. Assuming that an estimated capacitance is 0.3 pF, a resonance frequency resulting from the capacitance and the 1 mm-long wire is 10.3 GHz. With the inductance of 1.9 nH, the resonance frequency becomes 6.7 GHz. It is thus necessary to keep the wire length below 1 mm in light receiving modules capable of working at the transmission rates of about 10 Gbps or higher. For implementing it, the heights of the semiconductor photodetector 22, the signal processing semiconductor element 28, and the wiring substrate 12h are adjusted so as to be within ±1 mm and, preferably, within ±0.5 mm with respect to a reference plane including the optical fiber introduction axis.

Figure 3:
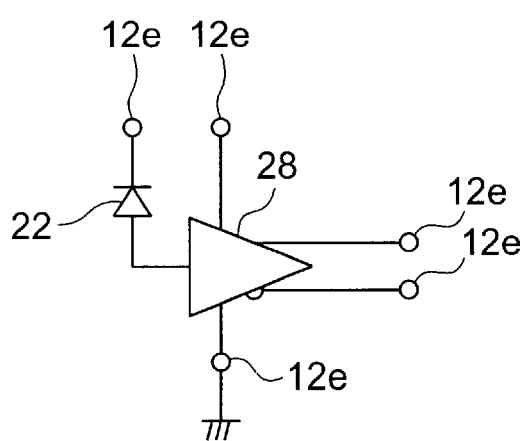
FIG. 3 is an equivalent circuit diagram of the pigtail type light receiving module of the first embodiment.

FIG. 3 shows an equivalent circuit of the light receiving module 2. One terminal of the semiconductor photodetector 22, e.g., the anode of a photodiode is connected to an input of the signal processing semiconductor element 28, e.g., an input of a preamplifier. The preamplifier amplifies a received signal and converts it into a pair of signals to provide differential signals. In this configuration, an electric signal from the photodetector 22 has a small amplitude and is amplified so as to be converted into the differential signals by the signal processing semiconductor element 28 placed in proximity to the light receiving element 22 and the differential signals are provided to the terminals 12e of the light receiving module.

Figure 4A:
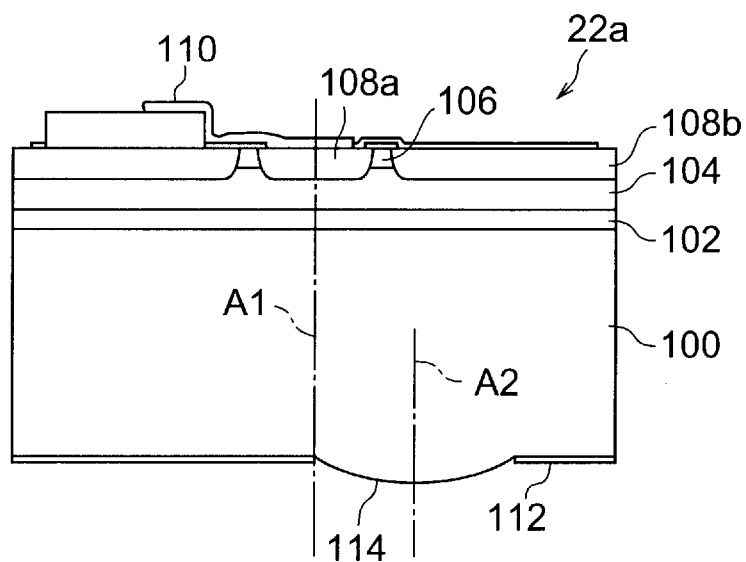
FIGS. 4A to 4C are schematic views of configurations of semiconductor photodetectors applicable to embodiments of light receiving modules according to the present invention.
Figure 4B:
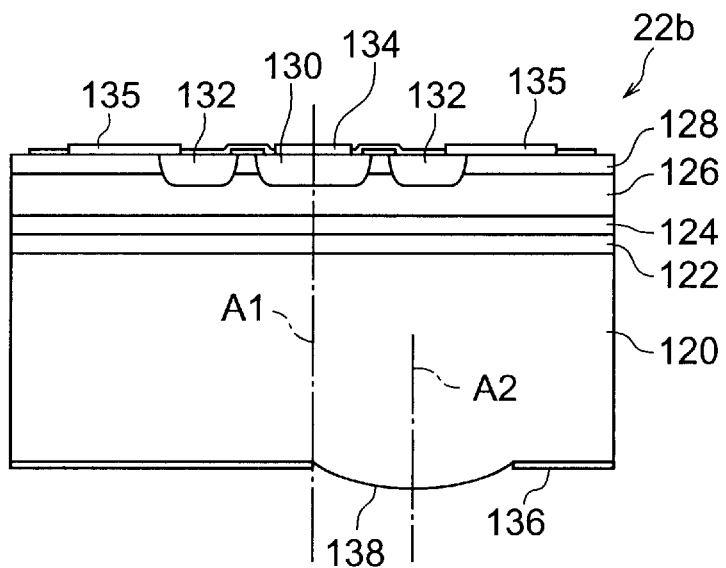
Figure 4C:
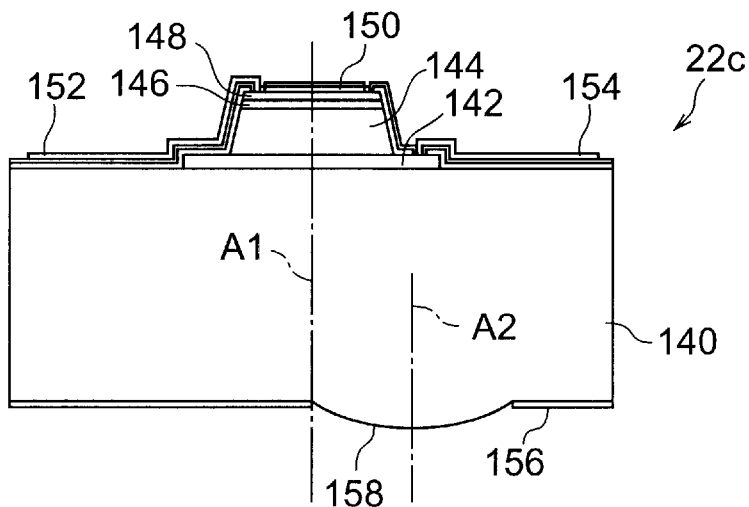

FIGS. 4A to 4C show semiconductor photodetectors 22a to 22c applicable to the present embodiment. The semiconductor photodetectors shown in FIGS. 4A to 4C all are back incidence type pin light receiving elements.

Referring to FIG. 4A, the light receiving element 22a comprises a S-doped $n^+$ type InP substrate 100, an i-type InP semiconductor layer 102, an i-type InGaAs semiconductor layer 104, an i-type InP semiconductor layer 106, a Zn-doped $p^+$ type semiconductor region 108a, and a $p^+$ type semiconductor region 108b. The i-type InP semiconductor layer 102, i-type InGaAs semiconductor layer 104, and i-type InP semiconductor layer 106 are formed in turn on the principal surface of the substrate 100. The $p^+$ type semiconductor region 108a and the $p^+$ type semiconductor region 108b are formed in the i-type InP semiconductor layer 106 and the i-type InGaAs semiconductor layer 104. The $p^+$ type semiconductor region 108a is arranged at the position specified by an axis A1. The $p^+$ type semiconductor region 108a serves as a light receiving element portion. The $p^+$ type semiconductor region 108b is formed around the $p^+$ type semiconductor region 108a and serves as a carrier capturing portion for quickly annihilating carriers generated by light incident to the outside of the light receiving element portion. An anode electrode 110 is placed on the $p^+$ type semiconductor region 108a. A monolithic lens 114 having a center axis (optical axis) A2 is formed on the back surface opposed to the principal surface of the substrate 100. A cathode electrode 112 is provided so as to surround the periphery of the monolithic lens 114.

Referring to FIG. 4B, the semiconductor light receiving element 22b comprises an Fe-doped semi-insulating InP substrate 120, a S-doped $n^+$ type InP semiconductor layer 122, an i-type InP semiconductor layer 124, an i-type InGaAs semiconductor layer 126, an i-type InP semiconductor layer 128, and Zn-doped $p^+$ type semiconductor regions 130 and 132. The S-doped $n^+$ type InP semiconductor layer 122, the i-type InP semiconductor layer 124, the i-type InGaAs semiconductor layer 126, and the i-type InP semiconductor layer 128 are formed in turn on the principal surface of the substrate 120. The semiconductor region 132 surrounds the semiconductor region 130. The $p^+$ type semiconductor regions 130 and 132 are formed in the i-type InP semiconductor layer 128 and the i-type InPGaAs semiconductor layer 126. The $p^+$ type semiconductor region 130 is placed at the position specified by the axis A1. The $p^+$ type semiconductor region 130 works as a light receiving portion. An anode electrode 134 is placed on the $p^+$ type semiconductor region 130. The $n^+$ type semiconductor region 132 is formed around the $p^+$ type semiconductor region 130 and functions as an electron capturing region. A cathode electrode 135 is placed on the InP semiconductor layer 128. A monolithic lens 138 having a center axis (optical axis) A2 is formed on the back surface opposed to the principal surface of the substrate 120. A metallic layer 136 is provided so as to surround the periphery of the monolithic lens 138. Since this device 22b is constructed using the Fe-doped semi-insulating substrate, absorption loss is small in the substrate.

Referring to FIG. 4C, the mesa type semiconductor light receiving element 22c comprises an Fe-doped semi-insulating InP substrate 140, a S-doped $n^+$ type InP semiconductor layer 142, an i-type InGaAs semiconductor layer 144, a Zn-doped $p^+$ type InGaAs semiconductor layer 146, and a $p^+$ type InGaAs semiconductor region 148 doped with a high concentration of Zn. The S-doped $n^+$ type InP semiconductor layer 142, the i-type InGaAs semiconductor layer 144, the Zn-doped $p^+$ type InGaAs semiconductor layer 146, and the heavily Zn-doped $p^+$ type InGaAs semiconductor region 148 formed in turn on the principal surface of this substrate 140. The i-type InGaAs semiconductor layer 144, Zn-doped $p^+$ type InGaAs semiconductor layer 146, and $p^+$ InGaAs semiconductor region 148 are placed at the position specified by the axis A1. The i-type InGaAs semiconductor layer 144, Zn-doped p+ type InGaAs semiconductor layer 146, and p+ type InGaAs semiconductor region 148 work as a light receiving portion. The p+ type InGaAs semiconductor region 148 is provided with an anode electrode 152. The n+ type InP semiconductor layer 142 serves as a cathode leading path. A cathode electrode 154 is arranged on the n+ type InP semiconductor region 142. A monolithic lens 158 having a center axis (optical axis) A2 is formed on the back surface opposed to the principal surface of the substrate 140. A metallic layer 156 is provided so as to surround the periphery of the monolithic lens 158.

A part of light incident to the semiconductor photodetector travels through the light absorbing region without absorption of the light. A part of transmitting light is reflected by the metal film provided on the upper surface of the semiconductor photodetector and then travels toward the light absorbing region (104, 126, 144, 146 and 148). This reflected light is absorbed while passing the light absorbing region (104, 126, 144, 146 and 148).

Figure 5A:
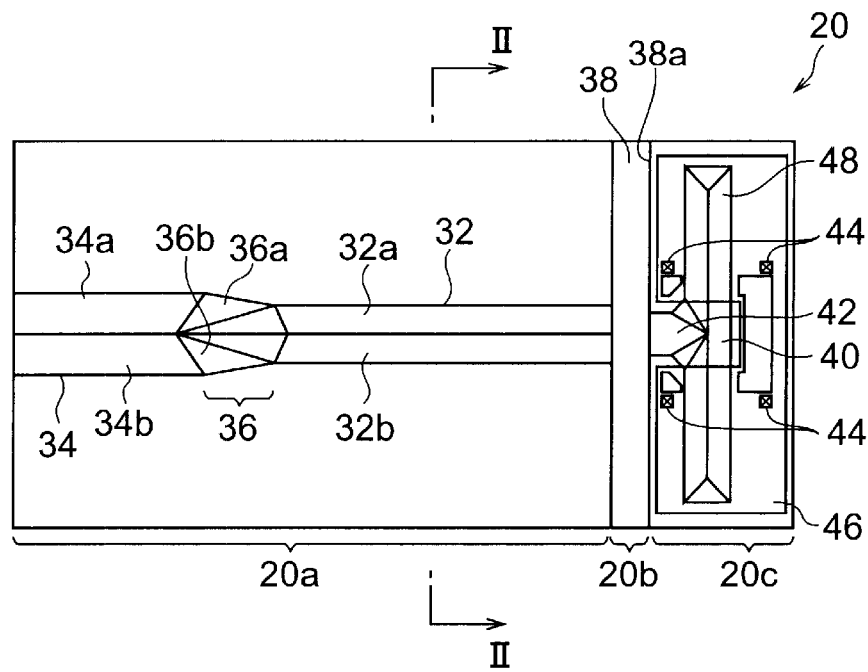
FIG. 5A is a plan view of a mounting substrate.
Figure 5B:
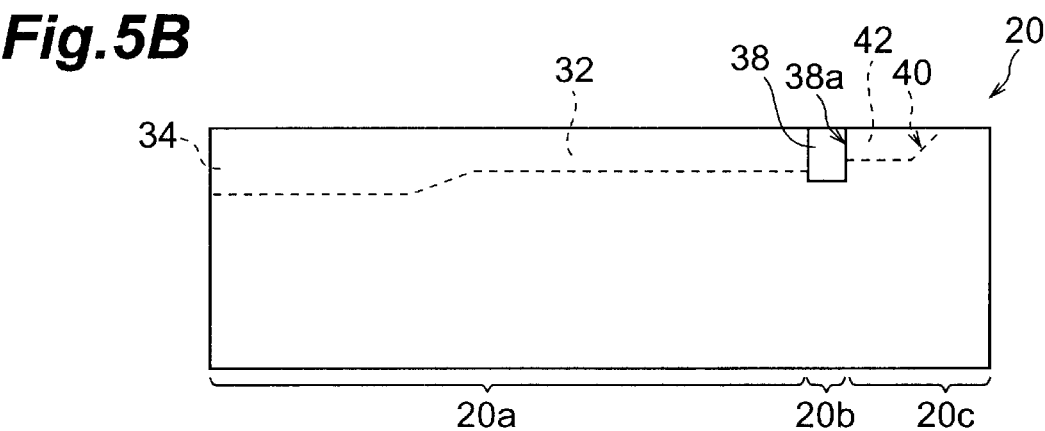
FIG. 5B is a side view of the mounting substrate.
Figure 5C:
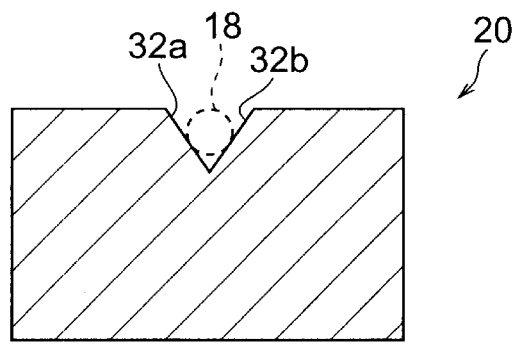
FIG. 5C is a cross-sectional view of the mounting substrate taken along line II—II of FIG. 5A.

The mounting substrate 20 will be explained with reference to FIGS. 5A to 5C. The mounting substrate 20 comprises first to third regions 20a, 20b, 20c placed in the predetermined direction.

An optical fiber supporting groove 32 is formed in the first region 20a so as to extending in the predetermined direction. The optical fiber supporting groove 32 has fiber supporting faces 32a and 32b each capable of supporting the side face of the optical fiber. The first region 20a also has an optical fiber introducing groove 34 extending in the predetermined direction. The optical fiber introducing groove 34 extends from one edge of the mounting substrate 20 up to the optical fiber supporting groove 32. The optical fiber introducing groove 34 also has two constitutive faces 34a and 34b as the optical fiber supporting groove 32 does. The optical fiber introducing groove 34 is, however, deeper than the optical fiber supporting groove 32. There may be a taper region 36 at a junction between the optical fiber introducing groove 34 and the optical fiber supporting groove 32. The taper region 36 includes taper surfaces 36a and 36b connecting the optical fiber supporting face 32a and 32b with the side face 34a and 34b, respectively. The optical fiber supporting groove 32 defines the position of the optical fiber in the direction perpendicular to the predetermined direction.

The second region 20b is provided with a positioning groove 38 extending in the direction perpendicular to the predetermined direction. The positioning groove 38 has an abutment face 38a extending in the direction perpendicular to the predetermined direction. The first end of the optical fiber, which has placed in the optical fiber supporting groove 32, abuts against the abutment face 38a, whereby the optical fiber is positioned in the predetermined direction. This positioning eliminates need for optical alignment of the optical fiber. The cover member 24 is placed on the mounting substrate 20 so as to cover the optical fiber, thereby securing the optical fiber.

The third region 20c is provided with a photodetector mounting portion. The photodetector mounting portion has a reflective surface 40 extending in the direction perpendicular to the predetermined direction, and a light introducing path 42 extending in the predetermined direction from the reflective surface 40 to the positioning groove 38. The light introducing path 42 may be a groove providing an optical path from the first end of the optical fiber, placed in the optical fiber supporting groove 32, to the reflective surface 40. An electrode 46 for either of the cathode and anode of the semiconductor photodetector 22 is formed in the photodetector mounting portion. Also, formed in the photodetector mounting portion is a groove 48 having an inclined plane (corresponding to reference numeral 40) extending in the direction perpendicular to the predetermined direction. The groove 48, if formed, can be utilized as the reflective surface. Since the width of the reflective surface 40 is broader than the width of the light introducing path 42, the area of the reflective surface can be larger than the inclined plane, formed at the end of the light introducing path 42, capable of working as the reflective surface. If the groove 48 is not formed, the two side faces composing the light introducing path 42 are adjacent to the inclined plane located at the end of the light introducing path 42. At this configuration, these side faces also reflect light from the optical fiber.

The third region is also provided with a plurality of positioning markers 44 for defining the mounting position of the semiconductor photodetector 22. The positioning markers 44 are formed in the same fabrication steps as the optical fiber supporting groove 32, the reflective surface 40 and the light introducing path 42, thereby enhancing the alignment accuracy between the optical fiber 18 and the semiconductor photodetector 22.

In a preferred embodiment, the mounting substrate 20 may be a silicon substrate. In this substrate, it is feasible to form the fiber supporting groove 32, fiber introducing groove 34, reflective surface 40, positioning markers 44 and light guide path 42 in the same etching step. The fiber supporting groove 32 and fiber introducing groove 34 may be a V-groove or trapezoid groove.

Figure 6:
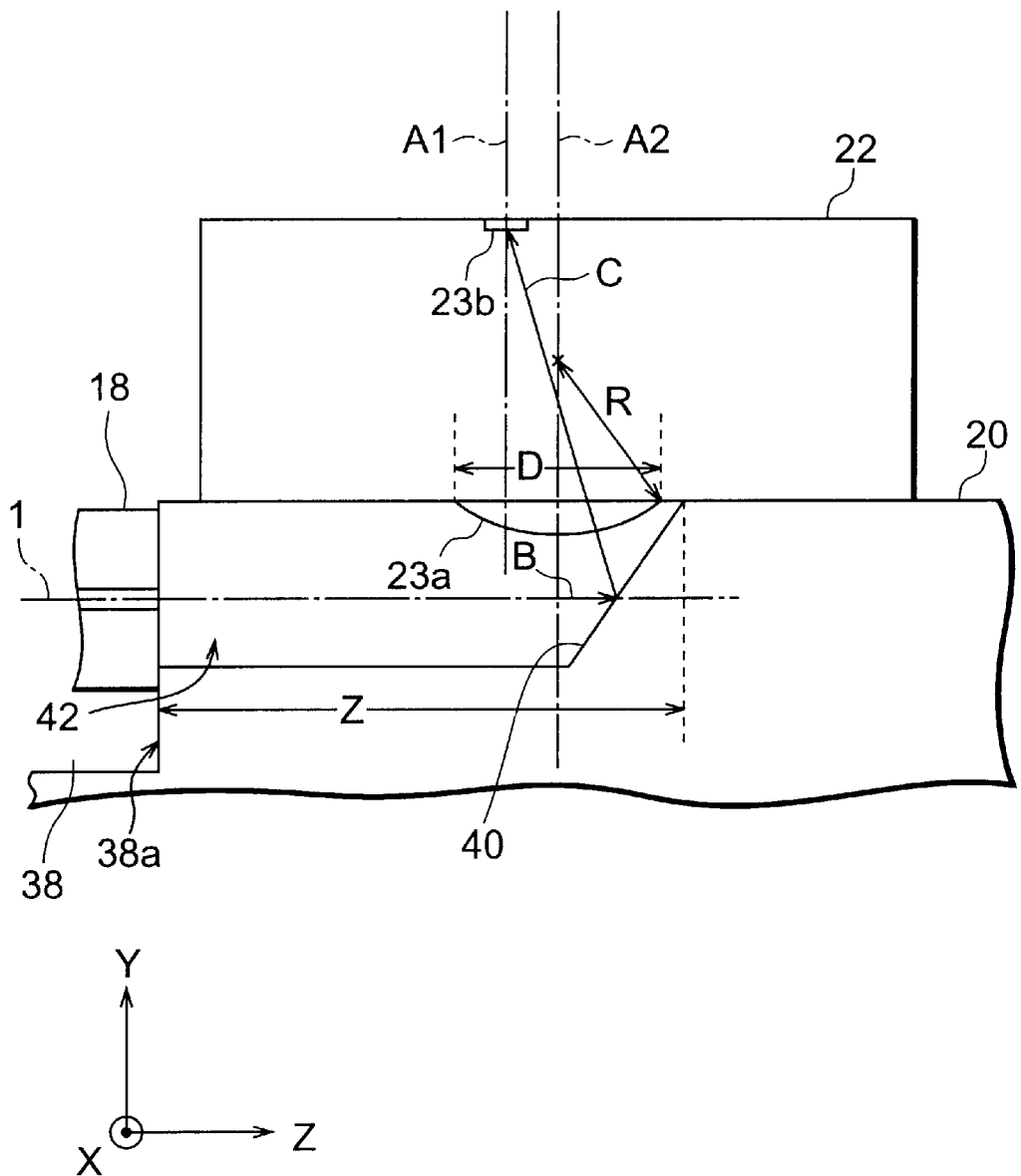
FIG. 6 is a schematic view of a configuration in which the optical fiber and the semiconductor photodetector are mounted on the mounting substrate.
Figure 7A:
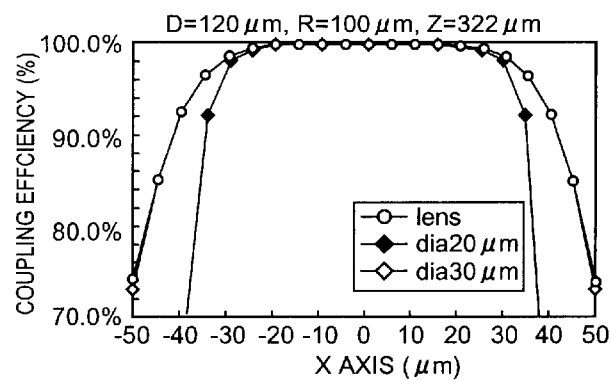
FIGS. 7A to 7D and FIG. 8 are views showing experimental results about variation in coupling efficiency against alignment error.
Figure 7B:
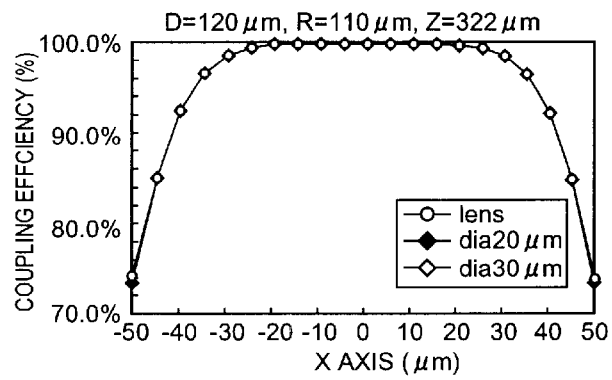
Figure 7C:
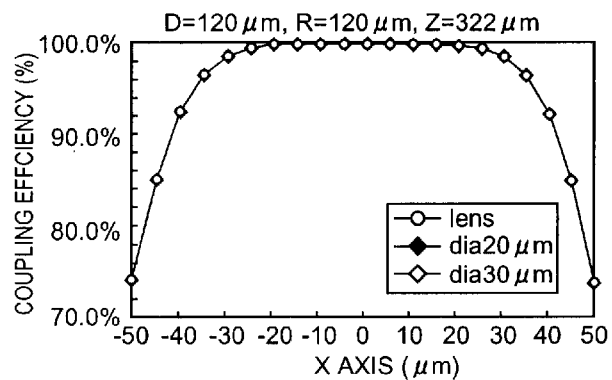
Figure 7D:
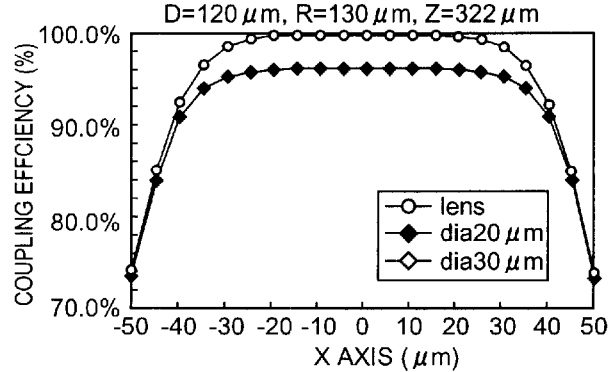

FIG. 6 shows a configuration in which the optical fiber 18 and the semiconductor photodetector 22 are mounted on the mounting substrate 20. The optical fiber 18 is positioned by the fiber supporting groove 32 and the abutment face 38a. Light B is emitted from the first end of the optical fiber 18 and travels in a direction of the axis 1. The light B travels in the light introducing path 42 to the reflective surface 40 and is reflected thereby to form light C. The reflected light C passes through the monolithic lens 23a to the semiconductor photodetector 23b.

The optical fiber 18 and semiconductor photodetector 22 are positioned with reference to the mounting substrate 20 such that light from the optical fiber 18 passes through the central area of the monolithic lens. This arrangement enhances the tolerance to variation in the radius of curvature of the monolithic lens 23a. This radius of curvature is determined in connection with the area of the light detection region of the photodetector 23b because a smaller light detection region is more advantageous to fast operation. According to inventor's estimation, in order to implement transmission at the transmission rates of about 10 Gbps, the diameter of the light detection portion should not be more than about 70 $\mu$m and the capacitance should not be more than about 0.42 pF.

As the focal length of the monolithic lens 23a becomes longer, the semiconductor photodetector becomes thicker. The larger the radius of curvature, the closer the tolerance becomes to the variation in the radius of curvature and the thinner the semiconductor photodetector becomes. This will, however, lower the mechanical strength of the photodetector.

Figure 8:
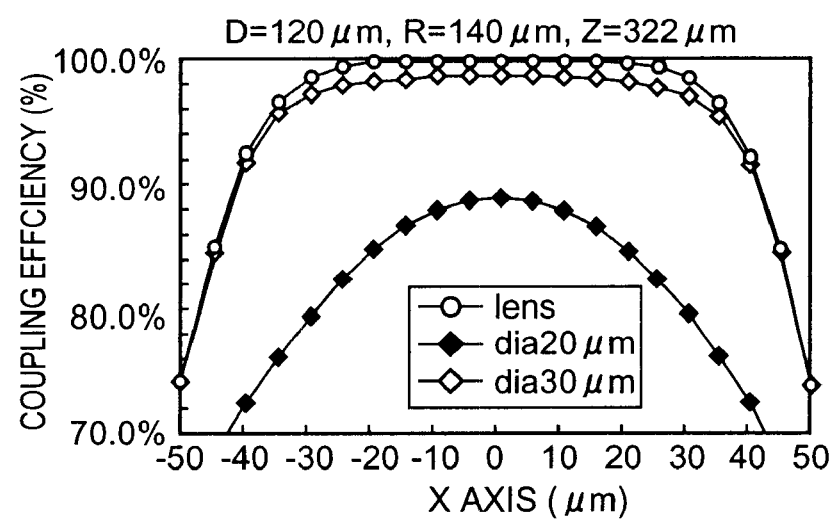

FIGS. 7A to 7D and FIG. 8 show experimental results concerning optical coupling efficiency tolerance against alignment error for various radii R of curvature of the monolithic lens. In these figures, symbol "○" indicates a tolerance curve of optical coupling efficiency of a optical receiving module in which light from the optical fiber is incident to the lens, symbol "♦" indicates a tolerance curve of optical coupling efficiency of a optical receiving module in which light from the optical fiber is incident through the lens to the light detection region having a diameter of 20 μm, and symbol "◊" indicates a tolerance curve of optical coupling efficiency of a optical receiving module in which light from the optical fiber is incident through the lens to the light detection region having a diameter of 30 μm. The characteristics shown in FIGS. 7A to 7D are practically satisfactory, but the characteristics shown in FIG. 8 are not always satisfactory. These experimental results indicate that the light receiving module can obtain a broader plateau region when the monolithic lens has the radius of curvature in a certain range.

In FIGS. 7A to 7D and FIG. 8, symbol D represents the diameter of the monolithic lens, symbol R represents the radius of curvature of the monolithic lens, and symbol Z represents the distance between the first end of the optical fiber and the reflective surface 40 of the mounting substrate 20. FIG. 6 defines these symbols D, R and Z. In the optical system comprising the optical fiber 18, reflective surface 40 and light receiving element 22 as shown in FIG. 6, the Z-axis is taken in the extending direction of the optical fiber 18 and the X-axis is taken in the extending direction of the positioning groove 38. According to the experimental results in FIGS. 7A to 7D and FIG. 8, when D=120 μm and Z=322 μm and when the radius of curvature R was in the range of 100 μm to 130 μm, a plateau region of ±30 μm was secured on the X-axis and the plateau region of ±30 μm was also secured on the Z-axis. The inventor thinks that practical coupling efficiency should be not less than 90%.

Then, the assembly process steps for the light receiving module 2 will be described with reference to FIGS. 9A to 9D.

Figures 9A, 9B, 9C, 9D:
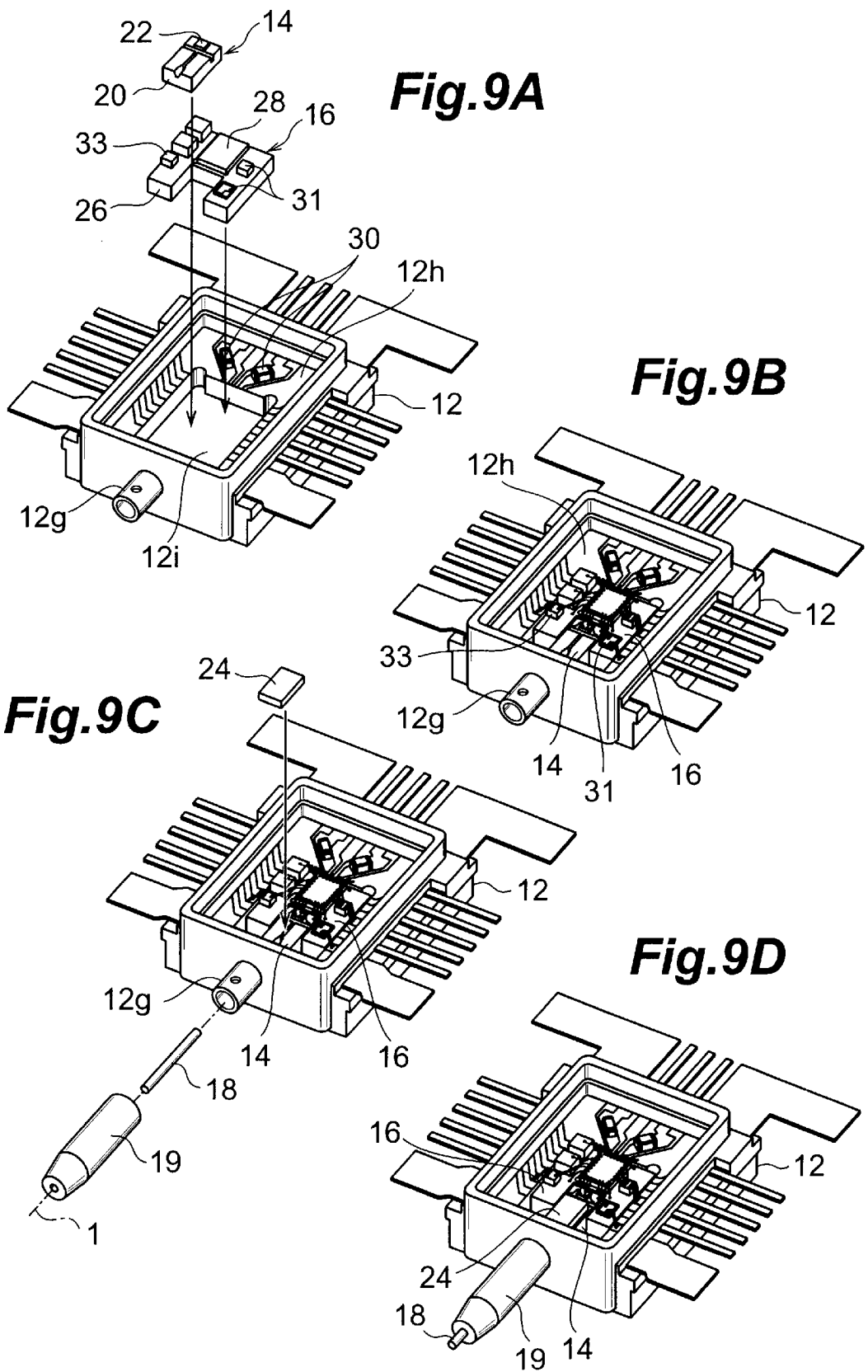
FIGS. 9A to 9D are drawings showing assembly steps of the light receiving module.

First prepared are the package 12, light receiving element assembly 14 and signal processor assembly 16 (FIG. 9A). In the light receiving assembly 14, the semiconductor photodetector 22 has already been arranged on the mounting substrate 20 and the semiconductor photodetector 22 is connected to the electrodes on the mounting substrate 20. In the signal processor assembly 16, the signal processing semiconductor element 28 and passive elements 31 has already been arranged on the mount member 26. These elements are electrically connected to each other and the wiring member 33 is also arranged on the mounting member 26.

Then the light receiving assembly 14 and signal processor assembly 16 are arranged on the bottom portion 12i of the package 12 (FIG. 9B). The light receiving assembly 14 is positioned with reference to the optical fiber inlet 12f. The signal processor assembly 16 is positioned with reference to the light receiving assembly 14. The semiconductor photodetector 22 and signal processing semiconductor element 28 are connected with each other through the mounting member 26, passive components 31 and wiring member 33 or directly to the wiring substrate 12h.

Next, prepared are the optical fiber 18, rubber boot 19 and cover member 24 (FIG. 9C).

Then, the optical fiber 18 is introduced through the guide portion 12g and fiber inlet 12f into the package 12. The optical fiber 18 thus introduced is placed in the optical fiber supporting groove 32 of the mounting substrate 20. Further, the optical fiber 18 is moved in the direction of the predetermined axis 1 until the first end of the optical fiber 18 comes to abut against the abutment face 38a. This completes the positioning of the optical fiber 18. After this positioning, the optical fiber 18 is secured to the mounting substrate 20 by the cover member 24. After this securing, the guide portion 12g is covered by the rubber boot 19 (FIG. 9D).

Finally, an opening of the package 12 is covered with a lid member (not shown). This completes the light receiving module 2.

Second Embodiment

Figure 10A:
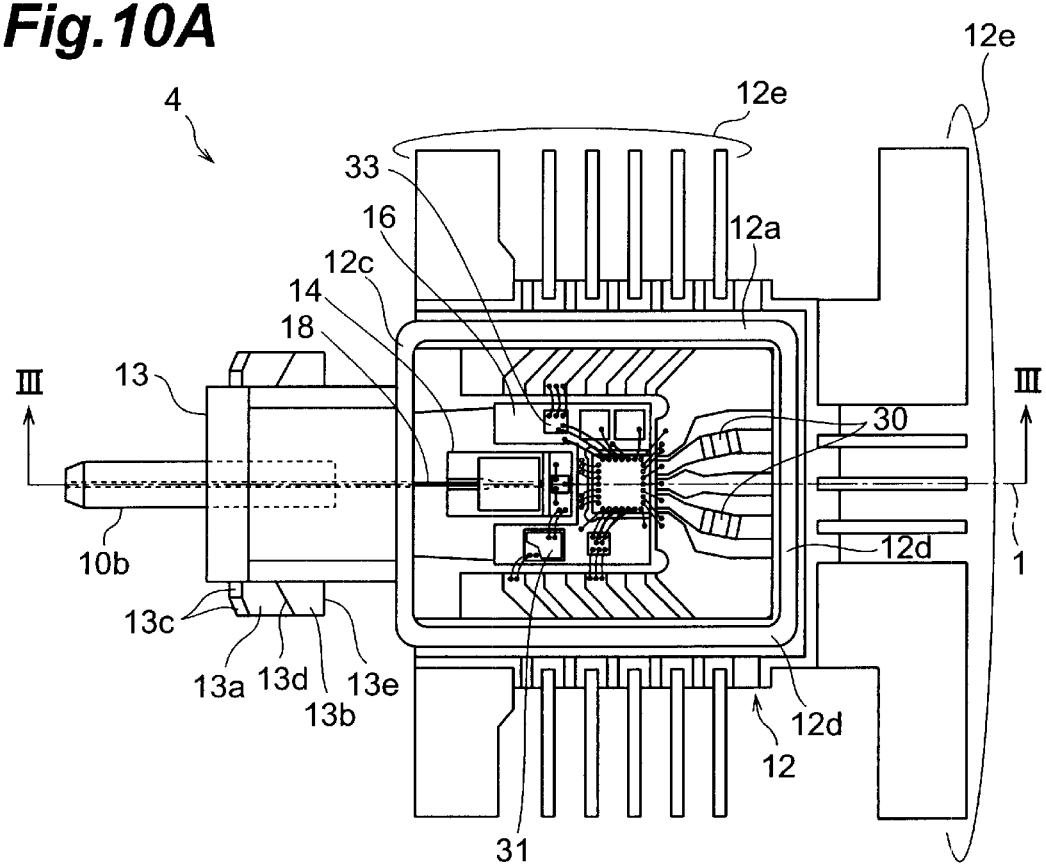
FIG. 10A is a plan view of an light receiving module according to the second embodiment.
Figure 10B:
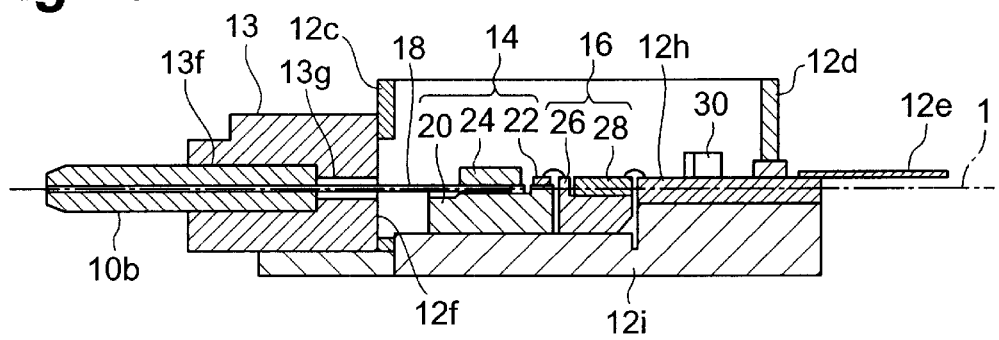
FIG. 10B is a cross-sectional view taken along line III—III of the light receiving module according to the second embodiment.
Figure 11:
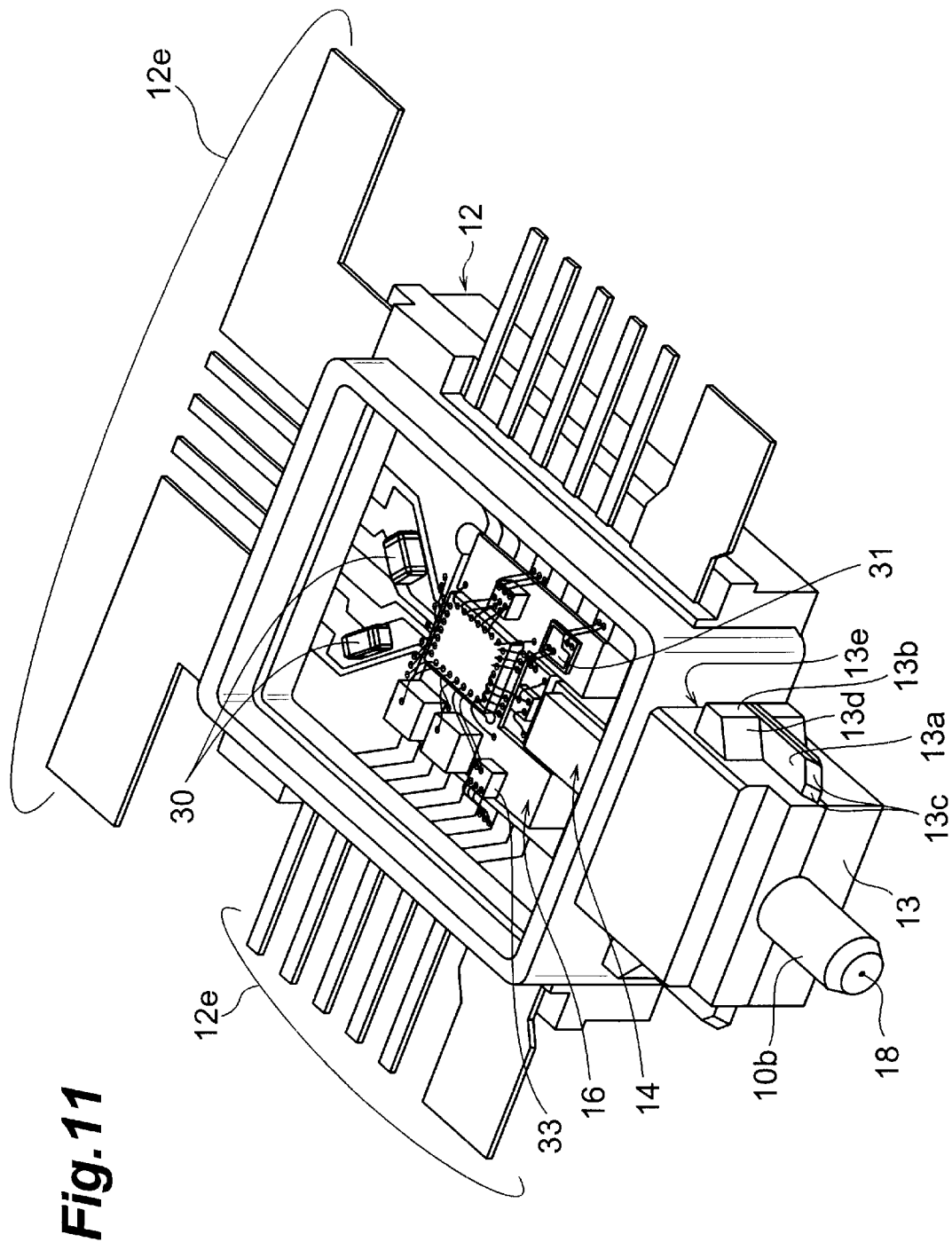
FIG. 11 is a perspective view showing the major part of the light receiving module of the second embodiment.

The light receiving module according to the second embodiment will be described referring to FIGS. 10A and 10B, and FIG. 11.

The light receiving module 4 comprises the optical coupling device 10b, the package 12, the light receiving assembly 14, the signal processing assembly 16 and the optical fiber 18.

The package 12 is equipped with a head portion 13 instead of the guide 12g. The head portion 13 has a ferrule guide hole 13f and an optical fiber passing hole 13g extending in the direction of the predetermined axis 1. A ferrule 10b is inserted in the ferrule guide hole 13f. An end portion of the optical fiber 18 appears at one end of the ferrule 10b.

The head portion 13 is provided with guide projections 13a and latch projections 13b on a pair of side faces that are located between the both sides of the ferrule 10b. The guide projections 13a are arranged to extend in the predetermined axis 1, and the latch projections 13b are arranged at one end of the guide projections 13a and extend in the direction perpendicular to the extending direction of the predetermined axis 1.

Through the guide projections 13a and the latch projections 13b, another optical device (not shown), such as an optical connector, can be engaged with the head portion 13, thereby coupled to the light receiving module 4. For example, when the light receiving module 4 is engaged with the optical device, the engaging portions of the other optical connector are aligned with the guide projections 13a. For facilitating this alignment, taper faces 13c are provided at the other end of each guide projection 13a. As the optical connector is moved along the guide projections 13a, the engaging portions of the optical coupling device come to abut against the latch projections 13b. Once the engaging portions of the optical connector have ridden over the latch projections 13b, the latching completes. For facilitating this latching, taper faces 13d are provided in the side faces of the latch projections 13b.

Third Embodiment

Figure 12A:
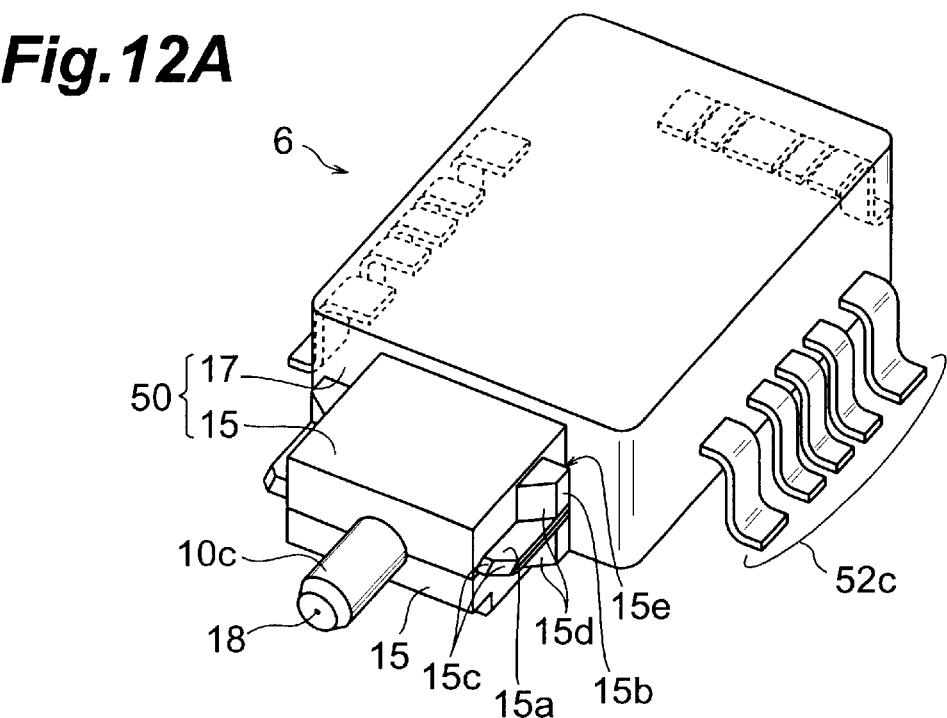
FIG. 12A is a perspective view of an light receiving module according to the third embodiment.
Figure 12B:
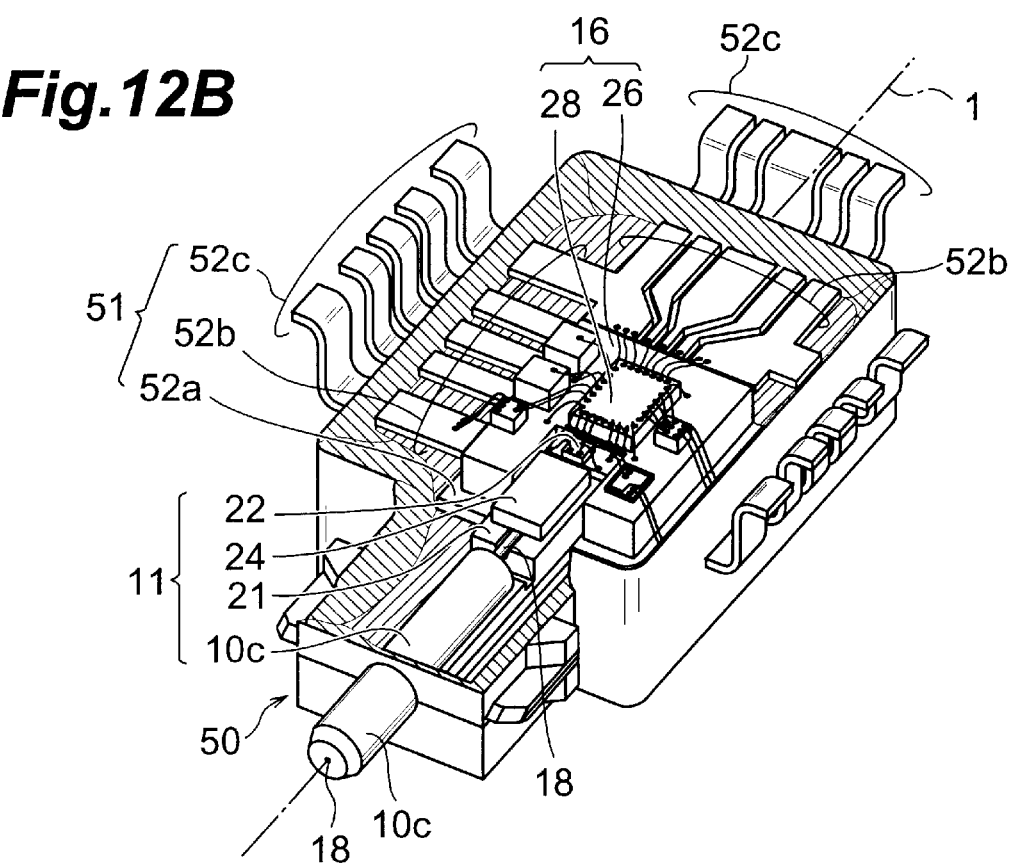
FIG. 12B is a partly broken view of the light receiving module according to the third embodiment.

The light receiving module according to the third embodiment will be described referring to FIGS. 12A and 12B. The light receiving module 6 comprises the light receiving assembly 11, which is different from the light receiving assembly 14 in the previous embodiments.

This light receiving module 6 comprises a molding resin body 50; an assembling member 51 including an island 52a and leads 52b and 52c; the light receiving assembly 11; the signal processing assembly 16; and the optical fiber 18. In the present embodiment, the light receiving assembly 11 comprises the ferrule 10c, the mount substrate 21, the semiconductor photodetector 22 and the cover member 24.

In the light receiving module 6, the light receiving assembly 11 and the signal processor assembly 16 are mounted in the direction of the predetermined axis 1 on the island 52a of the assembling member 51. The light receiving assembly 11 and the signal processing assembly 16 are electrically connected to the inner leads 52b of the assembling member 51 through bonding wires.

The molding resin body 50 has a resin head portion 15 and a resin main body 17. The resin head portion 15 and the resin main body 17 mold the ferrule 10c, and the light receiving assembly 11 and the signal processing assembly 16, which are mounted on the island 52a therein. A plurality of lead pins 52c are arrayed on side faces of the resin main body 17. The outer lead pins 52c are electrically connected in the resin main body 17 through the inner lead pins 52b to the light receiving element 22 and the signal processing semiconductor element 28.

The resin head portion 15 holds the ferrule 10c so as to be directed in the direction of the predetermined axis 1. One end of the optical fiber 18 appears at one end of the ferrule 10c. The resin head portion 15 is provided with guide projections 15a and latch projections 15b on a pair of side faces which are located between the both sides of the ferrule 10c. The guide projections 15a, latch projections 15b, and taper faces 15c and 15d correspond to the guide projections 13a, latch projections 13b, and taper faces 13c and 13d of the head portion 13 in the second embodiment, respectively, but they are not limited to the present example.

Figure 13A:
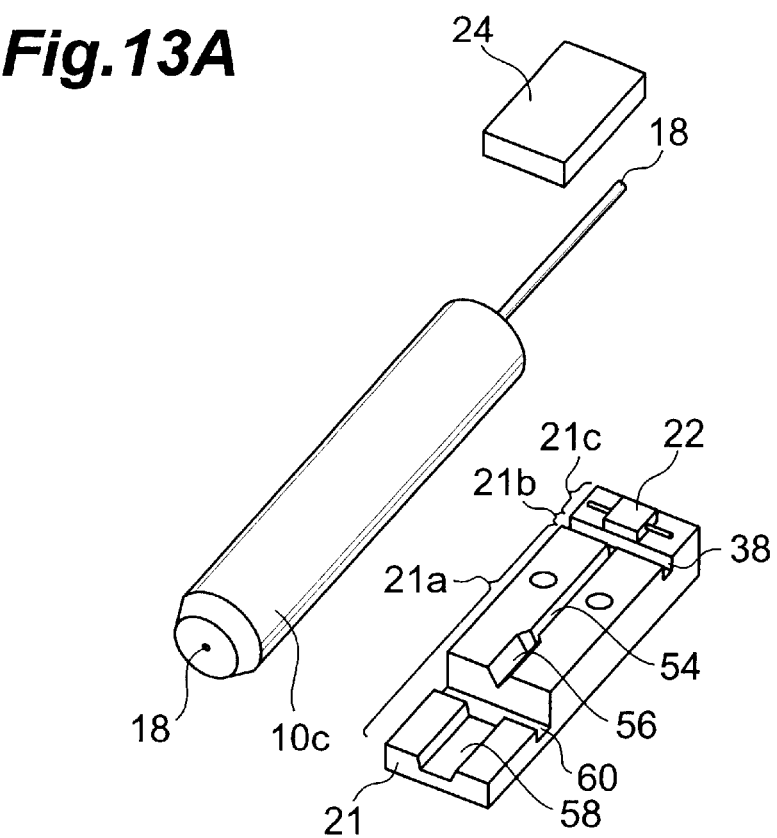
FIGS. 13A and 13B are drawings showing fabrication steps of the light receiving module.

As shown in FIG. 13A, the light receiving assembly 11 has the mounting substrate 21. The mounting substrate 21 comprises first to third regions 21a to 21c. The second and third regions 21b and 21c of the mounting substrate 21 can be of the same structure as the second and third regions 20b and 20c of the mounting substrate 20, but they are not limited to the present example. The first region 21a of the mounting substrate 21 has an optical fiber supporting groove 54, an optical fiber introducing groove 56 and a ferrule supporting groove (ferrule supporting portion) 58 therein. These grooves 54, 56, 58 extend in the extending direction of the axis 1. The ferrule supporting groove 58 can support the ferrule 10c by its two faces. A separation groove 60 extends in a direction perpendicular to the extending direction of the axis 1 and is provided between the optical fiber introducing groove 56 and the ferrule supporting groove 58.

Figure 13B:
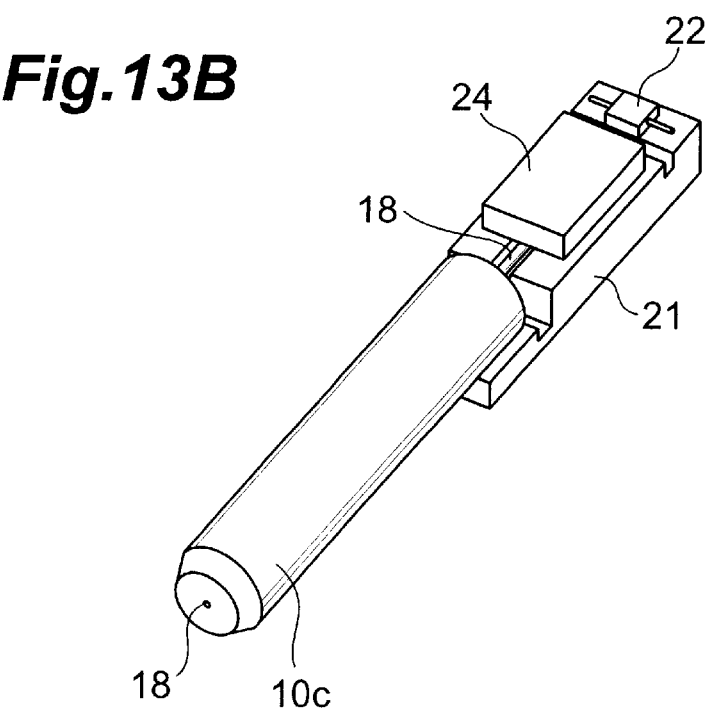

As shown in FIG. 13B, the ferrule 10c and the optical fiber 18 are placed in the ferrule supporting groove 58 and in the optical fiber supporting groove 54, respectively. The first end of the optical fiber 18 is guided to abut against an abutment groove (for example, corresponding to reference numeral 38a of FIG. 5B). This abutment positions the optical fiber 18 to the mounting substrate 21. After this positioning, the optical fiber 16 is secured between the mounting substrate 21 and the cover member 24.

Figure 14A:
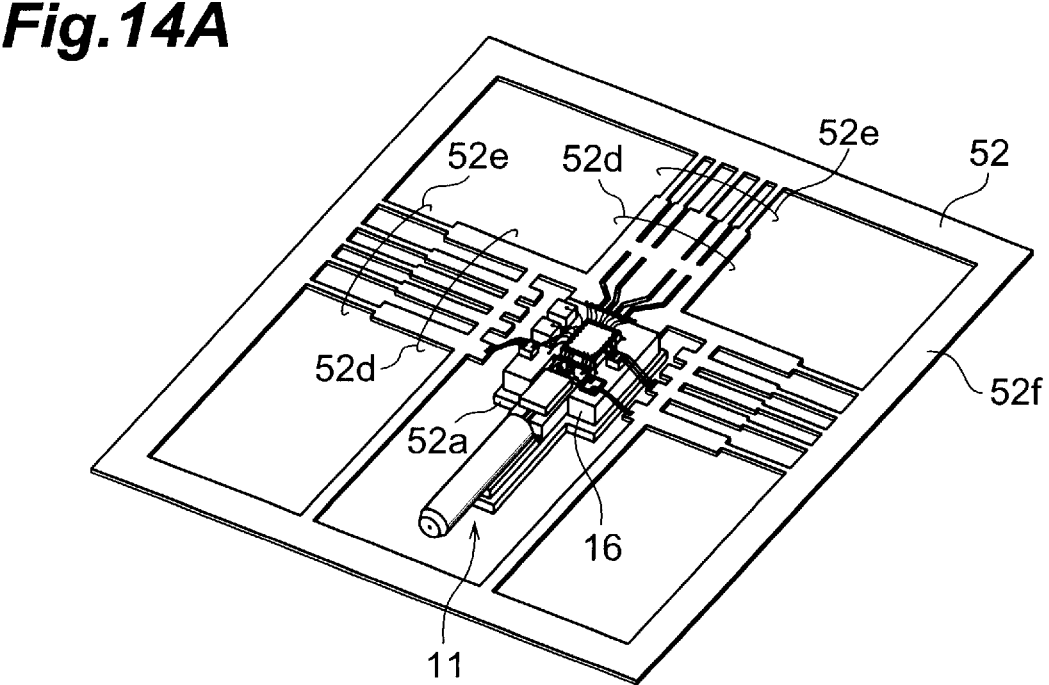
FIGS. 14A and 14B are drawings showing fabrication steps of the light receiving module.

Referring to FIG. 14A, the light receiving assembly 11 and the signal processing assembly 16 are mounted on a lead frame component 52. The lead frame component 52 comprises an island 52a, inner leads 52d, outer leads 52e, and an outside frame 52f supporting the inner leads 52d and outer leads 52e. The light receiving assembly 11 and signal processing assembly 16 are mounted on the island 52a such that the ferrule 10c is directed in the extending direction of the predetermined axis 1.

Figure 14B:
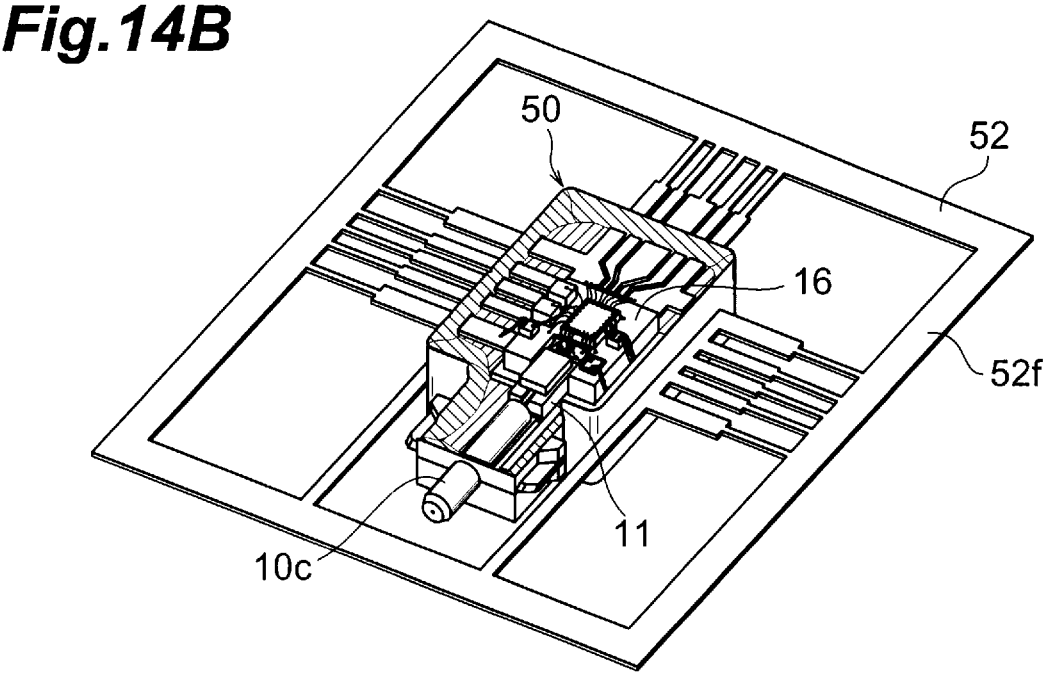

Referring to FIG. 14B, the light receiving assembly 11, signal processing assembly 16 and the lead frame component 52 are molded in the resin. The resin body 50 protects the light receiving assembly 11 and the signal processing assembly 16. The tie bars and the outside frame of the lead frame component 52 are cut so as to separate the island 52a, inner leads 52d, and outer leads 52e, thereby forming the assembling member 51. Thereafter, the outer leads are bent to form the leads. The light receiving module 6 is completed.

The principle of the present invention has been shown and described heretofore with the preferred embodiments thereof, and it should be apparent to those skilled in the art that the present invention can be modified in arrangements and in details without departing from the principle described. Since the light receiving modules described above exclude such a component as a lens holder or a concave mirror, it becomes feasible to implement miniaturization of the light receiving modules in terms of packaging area and height. Therefore, the height of the light receiving module was reduced to 4.1 mm, for example. The signal processing semiconductor element is placed on the mounting member separate from the mount member. Therefore, even when the signal processing semiconductor element is replaced with that of another type in order to change electrical characteristics thereof, only the mounting member should be redesigned and there is no need for redesigning the other components. The semiconductor processing semiconductor element generates heat, which does not transfer directly to the semiconductor photodetector and the optical fiber. Such variations and modifications are not to be regarded as a departure from the spirit and scope of the invention, and all such variations and modifications as would be obvious to one skilled in the art are intended for inclusion within the scope of the following claims.

What is claimed is:

1. An light receiving module comprising:

a mounting member having a pair of arm portions extending in a first direction and a connecting portion connecting said pair of arm portions, said connecting portion extending in a direction intersecting with said first direction;

an optical fiber having a first end and a second end;

a semiconductor photodetector;

a mounting substrate placed between said pair of arm portions of said mounting member, said mounting substrate mounting said optical fiber and said semiconductor photodetector such that the first end of said optical fiber is optically coupled to said semiconductor photodetector; and a signal processing semiconductor element, placed on said mounting member, for processing a signal from said semiconductor photodetector.

2. The light receiving module according to claim 1, wherein said semiconductor photodetector has an electrode surface and electrode pads, said electrode pads being provided on said electrode surface, wherein said signal processing semiconductor element has a pad surface and electrode pads, said electrode pads being provided on said pad surface; and wherein said pad surface and said electrode surface are arranged so as to be positioned relative to a reference surface within a range of manufacturing positional variation.

3. The light receiving module according to claim 1, further comprising a housing, said housing having a wiring surface provided with a wiring layer and said housing accommodating said mounting member and said mounting substrate, wherein said signal processing semiconductor element has a pad surface and electrode pads, said electrode pads are provided on said pad surface, and wherein said wiring surface and said pad surface are arranged to be positioned relative to a reference surface within a range of manufacturing positional variation.

4. The light receiving module according to claim 1, further comprising a housing, said housing having a wiring surface provided with a wiring layer and said housing accommodating said mounting member and said mounting substrate, wherein said semiconductor photodetector has an electrode surface and connection pads, said connection pads are provided on said electrode surface, wherein said signal processing semiconductor element has a pad surface and electrode pads, said electrode pads being provided on said pad surface, and wherein said pad surface, said wiring surface, and said mounting surface are arranged so as to be positioned to a reference surface within a range of manufacturing positional variation.

5. The light receiving module according to claim 1, further comprising a housing, said housing accommodating said mounting substrate and said mounting member, wherein said housing has a plurality of wall portions and terminals, wherein said mounting member is arranged to be located between said mounting substrate and said plurality of wall portions, and wherein said semiconductor photodetector is electrically connected to said terminals through a wiring member placed on said mounting member.

6. The light receiving module according to claim 1, wherein said optical fiber, said semiconductor photodetector, and said signal processing semiconductor element are arranged in turn in the first direction, and wherein said semiconductor photodetector is arranged so as to face one side of said signal processing semiconductor element.

7. The light receiving module according to claim 1, wherein said mounting member has a depressed portion provided in a principal surface thereof and said signal processing semiconductor element is placed in the depressed portion.

8. The light receiving module according to claim 1, wherein said mounting member has a thermal conductivity greater than that of said mounting substrate.

9. The light receiving module according to claim 1, wherein said mounting substrate comprises first, second and third regions provided in said first direction on a principal surface thereof;

wherein said first region is provided with an optical fiber supporting portion extending in said first direction, wherein said second region is provided with a positioning portion having an abutment face extending in the direction intersecting with said first direction;

wherein said third region is provided with a photodetector mounting portion, said semiconductor photodetector is placed on said photodetector mounting portion; and wherein the photodetector mounting portion has a reflective surface and a light guide path, said reflective surface extending in the direction intersecting with said first direction, and said light guide path being provided for guiding light from said optical fiber to said reflective surface.

10. The light receiving module according to claim 9, wherein said optical fiber supporting portion has first and second support faces for supporting said optical fiber, and wherein said optical fiber is supported by said first and second support faces while said first end of said optical fiber abuts against said abutment face.

11. The light receiving module according to claim 9, wherein said semiconductor photodetector has a light incidence surface, a monolithic lens being provided on said light incidence surface, and wherein said semiconductor photodetector is arranged such that said light incidence surface faces said photodetector mounting portion of said mounting substrate.

12. The light receiving module according to claim 11, wherein said light guide path has a size sufficient to accommodate said monolithic lens.

13. The light receiving module according to claim 1, wherein said housing has an inlet, said optical fiber is introduced through said inlet, wherein said mounting substrate has an optical fiber introducing portion, said optical fiber from said inlet of said housing passing through said optical fiber introducing portion, and wherein said optical fiber introducing portion extends in said first direction from one side of said mounting substrate to said optical fiber supporting portion, said side of said mounting substrate facing said inlet portion of said housing.

14. The light receiving module according to claim 1, further comprising a cover member having a cover surface for positioning said optical fiber, wherein said optical fiber is positioned in said first region by said cover surface and said first and second support faces.

15. The light receiving module according to claim 1, further comprising a ferrule having a pair of end faces and holding said optical fiber, wherein the second end of said optical fiber appears at one of said pair of end faces.

16. The light receiving module according to claim 15, wherein said housing comprises a pair of latch projections and said ferrule is arranged between said pair of latch projections.

17. The light receiving module according to claim 1, further comprising a housing, said housing accommodating said mounting member and said mounting substrate, said housing comprising first and second wall portions extending in said first direction and a third wall portion extending along the direction intersecting with said first direction, and said housing further comprising a wiring substrate provided with a wiring layer and arranged along said first to third wall portions, wherein one of said arm portions is placed between said first wall portion and said mounting substrate, wherein the other of said arm portions is placed between said second wall portion and said mounting substrate, and wherein said connecting portion is placed between said third wall portion and said mounting substrate.

18. The light receiving module according to claim 1, further comprising:

an island mounting said mounting member and said mounting substrate;

a plurality of lead terminals; and a ferrule having a pair of end faces and holding said optical fiber, wherein the second end of said optical fiber appears at one of said pair of end faces.

19. The light receiving module according to claim 18, further comprising a molding resin body for molding said mounting member, said mounting substrate, said semiconductor photodetector, and said signal processing semiconductor element, wherein said ferrule projects from the molding resin body.

20. The light receiving module according to claim 18, wherein said plurality of lead terminals are arranged to face each of said pair of arm portions and said connecting portion of said mounting member.

* * * * *